(12) United States Patent
Xia et al.

(10) Patent No.: US 10,691,794 B2
(45) Date of Patent: Jun. 23, 2020

(54) METHOD, APPARATUS, AND ELECTRONIC DEVICE FOR DETECTING MODEL SECURITY

(71) Applicant: Alibaba Group Holding Limited, George Town (KY)

(72) Inventors: Jupeng Xia, Hangzhou (CN); Caiwei Li, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/668,857

(22) Filed: Oct. 30, 2019

(65) Prior Publication Data

US 2020/0065479 A1 Feb. 27, 2020

Related U.S. Application Data

(63) Continuation of application No. PCT/CN2018/103730, filed on Sep. 3, 2018.

(30) Foreign Application Priority Data

Sep. 7, 2017 (CN) .......................... 2017 1 0798683

(51) Int. Cl.
*G06F 21/57* (2013.01)
*G06F 21/53* (2013.01)
(Continued)

(52) U.S. Cl.
CPC ............ *G06F 21/53* (2013.01); *G06F 21/577* (2013.01); *G06N 3/0454* (2013.01); *G06N 3/08* (2013.01); *G06N 20/10* (2019.01); *G06N 20/20* (2019.01)

(58) Field of Classification Search
CPC .. G06F 21/53; G06F 21/577; G06F 2221/034; G06N 3/0454; G06N 3/08; G06N 20/10; G06N 20/20
See application file for complete search history.

(56) References Cited

U.S. PATENT DOCUMENTS 7,752,607 B2    7/2010   Larab et al.
10,110,622 B2 *   10/2018   Boia .................. H04L 63/1433
(Continued)

FOREIGN PATENT DOCUMENTS

CN         102955712       3/2013
CN         104077303       10/2014
(Continued)

OTHER PUBLICATIONS

Goodfellow et al., Generative Adversarial Nets, 2014.*
(Continued)

*Primary Examiner* — Minh Dinh
(74) *Attorney, Agent, or Firm* — Fish & Richardson P.C.

(57) ABSTRACT

Implementations of the present specification disclose a method and an apparatus for detecting model security and an electronic device. The method includes the following: obtaining result data computed by using a model, wherein the result data comprises intermediate result data and output result data; obtaining a discriminator through training by using a generative adversarial network (GAN) framework, the model, and a sample; discriminating the result data by using the discriminator by using the model for current input data, to detect whether the model is currently secure, wherein the model is in a trusted execution environment for obtaining the discriminator through training; and determining a security detection result of the model.

17 Claims, 5 Drawing Sheets

(51) Int. Cl.
*G06N 20/20* (2019.01)
*G06N 20/10* (2019.01)
*G06N 3/04* (2006.01)
*G06N 3/08* (2006.01)

(56) References Cited

U.S. PATENT DOCUMENTS

| | | | |
|---|---|---|---|
| 2006/0156274 | A1 | 7/2006 | Andreev et al. |
| 2018/0285694 | A1* | 10/2018 | Kobayashi ........... G06K 9/6277 |
| 2019/0109872 | A1* | 4/2019 | Dhakshinamoorthy ..................... G06F 21/577 |
| 2020/0050766 | A1* | 2/2020 | Bos ...................... G06F 21/577 |

FOREIGN PATENT DOCUMENTS

| | | |
|---|---|---|
| CN | 104731664 | 6/2015 |
| CN | 104915352 | 9/2015 |
| CN | 105095230 | 11/2015 |
| CN | 106951867 | 7/2017 |
| CN | 107808098 | 3/2018 |
| WO | WO 2010/069587 A1 * | 6/2010 ............. G06F 21/00 |

OTHER PUBLICATIONS

Crosby et al., "BlockChain Technology: Beyond Bitcoin," Sutardja Center for Entrepreneurship & Technology Technica Report, Oct. 16, 2015, 35 pages.

Nakamoto, "Bitcoin: A Peer-to-Peer Electronic Cash System," www.bitcoin.org, 2005, 9 pages.

PCT International Search Report and Written Opinion in International Application No. PCT/CN2018/103730, dated Nov. 20, 2018, 9 pages (with Partial English translation).

Biggio et al., "Security Evaluation of Pattern Classifiers under Attack," Cornell University Library, Sep. 2017, 14 pages.

Extended European Search Report in European Application No. 18854346.6, dated Mar. 27, 2020, 6 pages.

PCT International Preliminary Report on Patentability in International Application No. PCT/CN2018/103730, dated Mar. 10, 2020, 9 pages (with English translation).

* cited by examiner

METHOD, APPARATUS, AND ELECTRONIC DEVICE FOR DETECTING MODEL SECURITY

CROSS-REFERENCE TO RELATED APPLICATIONS

This application is a continuation of PCT Application No. PCT/CN2018/103730, filed on Sep. 3, 2018, which claims priority to Chinese Patent Application No. 201710798683.3, filed on Sep. 7, 2017, and each application is hereby incorporated by reference in its entirety.

TECHNICAL FIELD

The present specification relates to the field of computer software technologies, and in particular, to a method and an apparatus for detecting model security and an electronic device.

BACKGROUND

Deep learning is a popular technology field at present. Based on a deep learning model, tasks such as risk recognition, voice recognition, and image recognition can be performed.

In the existing technology, the deep learning model is usually on a server, but can also be in a relatively open environment such as a user terminal.

For the latter case, a model security detection solution is required.

SUMMARY

Implementations of the present specification provide a method and an apparatus for detecting model security and an electronic device, to detect security of a model in a relatively open environment.

To resolve the previous technical problem, the implementations of the present specification are implemented as described below.

An implementation of the present specification provides a method for detecting model security, including the following: obtaining result data computed by using a to-be-detected model, where the result data includes intermediate result data and/or output result data, and discriminating the result data by using a discriminator, and determining a security detection result of the to-be-detected model, where the discriminator is obtained through training by using a generative adversarial network (GAN) framework, the to-be-detected model, and a sample, and the to-be-detected model is in a trusted environment in the process of obtaining the discriminator through training.

An implementation of the present specification provides an apparatus for detecting model security, including the following: an acquisition module, configured to obtain result data computed by using a to-be-detected model, where the result data includes intermediate result data and/or output result data, and a detection module, configured to discriminate the result data by using a discriminator, and determine a security detection result of the to-be-detected model, where the discriminator is obtained through training by using a GAN framework, the to-be-detected model, and a sample, and the to-be-detected model is in a trusted environment in the process of obtaining the discriminator through training.

An implementation of the present specification provides an electronic device, including the following: at least one processor, and a memory communicatively connected to the at least one processor, where the memory stores an instruction that can be executed by the at least one processor, and the instruction is executed by the at least one processor, to enable the at least one processor to: obtain result data computed by using a to-be-detected model, where the result data includes intermediate result data and/or output result data, and discriminate the result data by using a discriminator, and determine a security detection result of the to-be-detected model, where the discriminator is obtained through training by using a GAN framework, the to-be-detected model, and a sample, and the to-be-detected model is in a trusted environment in the process of obtaining the discriminator through training.

The at least one technical solution used in the implementations of the present specification can achieve the following beneficial effects: The discriminator obtained through training based on the GAN framework can perform model security detection based on the intermediate result data and/or the output result data computed by using the to-be-detected model, to learn whether the computing process or the result is secure.

BRIEF DESCRIPTION OF DRAWINGS

To describe technical solutions in implementations of the present specification or in the existing technology more clearly, the following briefly describes the accompanying drawings required for describing the implementations or the existing technology. Apparently, the accompanying drawings in the following descriptions merely show some implementations of the present specification, and a person of ordinary skill in the art can still derive other drawings from these accompanying drawings without creative efforts.

DESCRIPTION OF IMPLEMENTATIONS

Implementations of the present specification provide a method and an apparatus for detecting model security and an electronic device.

To make a person skilled in the art better understand the technical solutions in the present specification, the following clearly describes the technical solutions in the implementations of the present specification with reference to the accompanying drawings in the implementations of the present specification. Apparently, the described implementations are merely some rather than all of the implementations of the present application. All other implementations obtained by a person of ordinary skill in the art based on the implementations of the present specification without creative efforts shall fall within the protection scope of the present application.

The present specification describes the concept of model security. For ease of understanding, the concept is explained herein.

The model is usually used for classification and prediction, and a risk control model is used for risk control in a typical application scenario. Some characteristic data is input to the risk control model to obtain result data through computing, and it is further determined whether a user or an event corresponding to the input characteristic data is at risk based on the result data.

In actual applications, a malicious user probably attacks a model by tampering with input data, computing logic, result data, etc of the model. As a result, a computing process or a computing result of the model is no longer to be trusted. In this case, the model can be considered as insecure. The present specification provides a model security detection solution.

Figure 1:
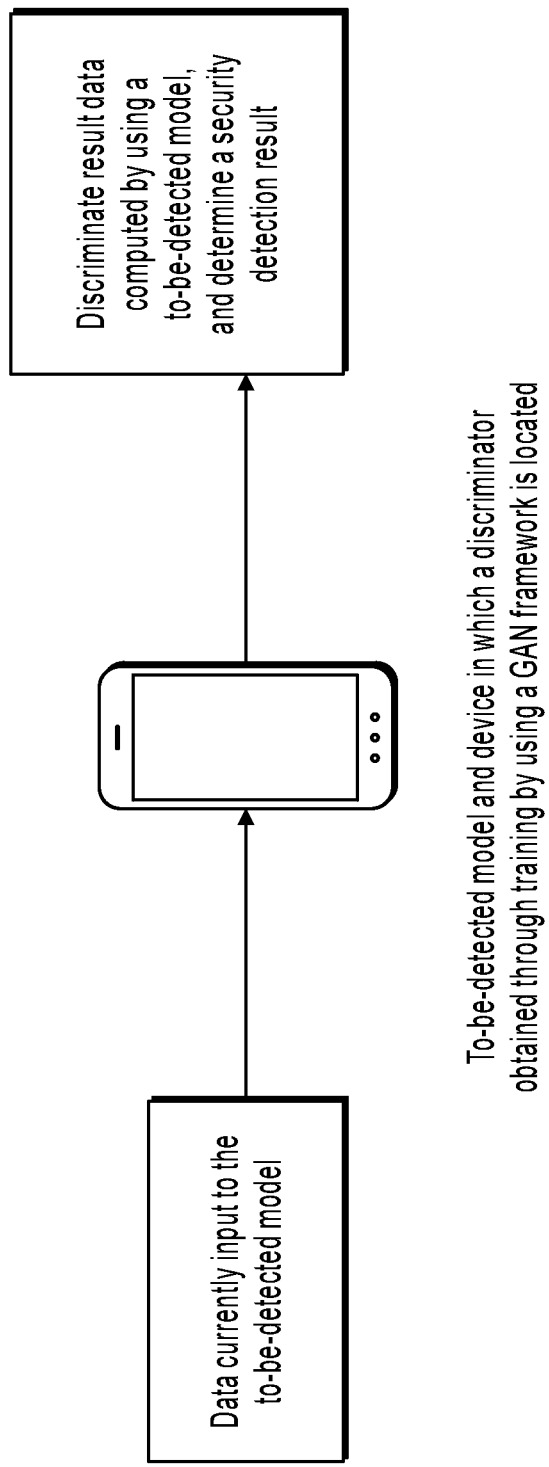
FIG. 1 is a schematic diagram illustrating an overall architecture in an actual application scenario of the solution in the present specification.

FIG. 1 is a schematic diagram illustrating an overall architecture in an actual application scenario of the solution in the present specification. The overall architecture mainly includes a to-be-detected model and a device in which a discriminator obtained through training by using a GAN framework is located. The discriminator is obtained through training by using the GAN framework, the to-be-detected model, and a sample, and the discriminator discriminates intermediate result data and/or output result data computed by using the to-be-detected model for current input data, to detect whether the to-be-detected model is currently secure.

The device can be a device in a relatively open environment such as a user terminal. For example, a risk control engine is deployed on a mobile phone, and edge computing is performed on the risk control engine to implement risk control on the mobile phone. In this case, the to-be-detected model can be a model in the risk control engine, and the mobile phone can be the device.

Based on the previous overall architecture, the following describes the solutions in the present specification in detail.

Figure 2:
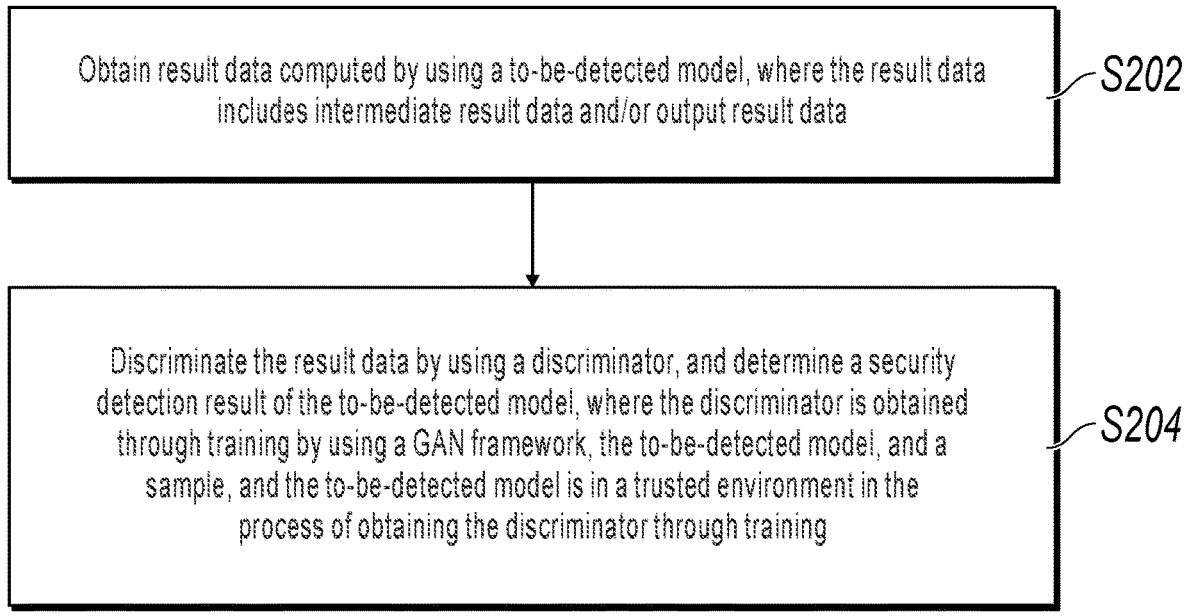
FIG. 2 is a schematic flowchart illustrating a method for detecting model security, according to an implementation of the present specification.

FIG. 2 is a schematic flowchart illustrating a method for detecting model security, according to an implementation of the present specification. The procedure can be executed by the following devices that can be used as a server or a server: a mobile phone, a tablet computer, an intelligent wearable device, an on-board unit, a personal computer, a medium-sized computer, a computer cluster, etc.

The procedure in FIG. 2 can include the following steps:

S202: Obtain result data computed by using a to-be-detected model, where the result data includes intermediate result data and/or output result data.

In this implementation of the present specification, the to-be-detected model is located in an execution body. The field to which the to-be-detected model belongs is not limited in the present application. For example, the to-be-detected model is a risk control model in the artificial intelligence field. Computing is performed based on input data (for example, behavior characteristic and environment information), and it is determined, based on the output result data obtained through computing, whether a current operation is performed by the user. In this case, security of the to-be-detected model is particularly important.

The result data can be in a plurality of forms. Generally, the result data is a vector.

Using a deep learning model as an example, a main body of the deep learning model is a deep neural network. Generally, input data of the deep neural network is a vector, and the previously described output result data output by an output layer of the deep neural network is also a vector. Further, if necessary, data computed by an intermediate layer (namely, a hidden layer) of the deep neural network can also be output, and the data output by the intermediate layer is also a vector, and belongs to the previously described intermediate result data.

In addition to the vector, the result data can be a value, a Boolean value, a character string, etc.

S204: Discriminate the result data by using a discriminator, and determine a security detection result of the to-be-detected model, where the discriminator is obtained through training by using a GAN framework, the to-be-detected model, and a sample, and the to-be-detected model is in a trusted environment in the process of obtaining the discriminator through training.

In this implementation of the present specification, the result data is computed by inputting data to the to-be-detected model. The input data can include no label and is usually used in a model prediction phase.

There may be a plurality of samples, and each sample can include a label and is usually used in a model training phase. When the discriminator is being trained, input the sample to the to-be-detected model for computing to obtain second result data, where the second result data includes second intermediate result data and/or second output result data.

It is worthwhile to note that "second" herein is merely used to distinguish the input data and the sample, and a manner for computing the result data by using the to-be-detected model can be the same as that for computing the second result data.

In this implementation of the present specification, the second result data is used as training data based on the GAN framework to obtain a corresponding GAN through training, where the GAN includes a generator and the discriminator. The generator can also be referred to as a generative (G) network, and the discriminator can also be referred to as a discriminative (D) network.

In this implementation of the present specification, in the process of obtaining the discriminator through training, computing also needs to be performed for the input sample by using the to-be-detected model, and the second result data obtained through computing is used as a training basis of the discriminator.

If the training process cannot be trusted, it is difficult to ensure that the discriminator obtained through training can be trusted. Therefore, make sure the to-be-detected model isin the trusted environment in the training process of the discriminator, to ensure that the second result data is authentic.

In the method in FIG. 2, the discriminator obtained through training based on the GAN framework can perform model security detection based on the intermediate result data and/or the output result data computed by using the to-be-detected model, to determine whether the computing process or the computing result is secure, and whether the computing process or the result is secure can directly reflect whether the to-be-detected model is secure.

Based on the method in FIG. 2, this implementation of the present specification further provides some specific implementation solutions and extension solutions of the method, which are described below.

In this implementation of the present specification, the obtaining a corresponding GAN through training by using the second result data and the GAN framework in step S204 can include: obtaining the second result data computed by using the to-be-detected model for the sample, where the second result data includes second intermediate result data and/or second output result data, and obtaining the corresponding GAN through training based on the second result data and the GAN framework (in other words, obtaining the discriminator through training), where the GAN includes the generator and the discriminator.

Further, for the model using a neural network such as the deep learning model, an intermediate result is usually higher than a corresponding output result in terms of dimension, and an amount of information included in the intermediate result is often more rich and more refined accordingly. For example, the intermediate result is a 100-dimensional vector, and the corresponding output result is a 10-dimensional vector. For another example, the intermediate result is a 100-dimensional vector, and the corresponding output result is a 1-dimensional Boolean value. It can be seen that the intermediate result to the output result is an information convergence process.

For the model in the preceding paragraph, the discriminator can be obtained through training based on the second intermediate result data, instead of the second output result data. As such, an information analysis capability of the discriminator can be improved, and a more accurate discrimination result can be obtained.

In addition, in actual applications, the to-be-detected model can be split from a more complete model. For example, a ten-layer neural network model is trained. After the training is completed, the first nine layers of the neural network model are extracted as the to-be-detected model. In this case, the output result of the to-be-detected model is actually an intermediate result of the neural network model. Therefore, it is appropriate to obtain the discriminator through training based on the output result data of the to-be-detected model.

Figure 3:
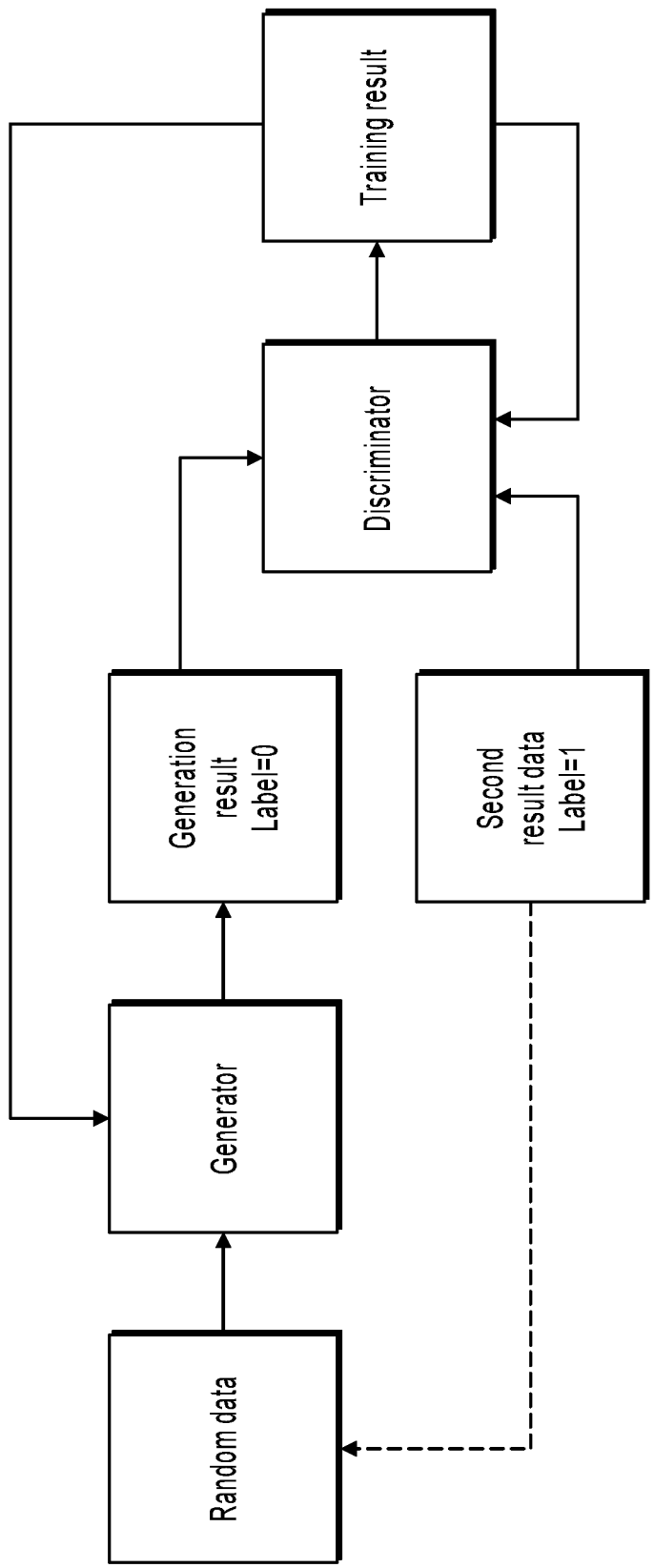
FIG. 3 is a schematic diagram illustrating a training principle of a discriminator used in the model security detection method, according to an implementation of the present specification.

FIG. 3 is a schematic diagram illustrating a training principle of a discriminator used in the model security detection method, according to an implementation of the present specification.

In FIG. 3, a trained GAN includes a discriminator and a generator. Second result data is used as a reference to train the GAN, so that the generator can generate a generation result whose data distribution is consistent with that of the second result data.

In the training process, if the second result data is true (Label=1), the generation result is false (Label=0). The second result data and the generation result are separately input to the discriminator to determine whether the second result data and the generation result are true or false. A training objective of the generator is to allow a discrimination error for the generation result, and a training objective of the discriminator is to avoid a discrimination error for the generation result and a discrimination error for the second result data.

Generally, in the training process, data input to the generator is random data, such as a random number or a random vector. Further, to make the training process converge as soon as possible, the second result data can be superposed to the random data as input of the generator. As such, the input data of the generator includes at least some data distribution features of the second result data, so that data distribution of the generation result is more approximate to the data distribution of the second result data.

Certainly, data obtained after non-linear transformation is performed on the second result data can be input to the generator without the random data.

Based on the previous description, the obtaining a corresponding GAN through training based on the second result data and the GAN framework includes the following: generating data to be input to the generator based on the random data and/or the second result data, and obtaining the corresponding GAN through training based on the second result data, the data to be input to the generator, and the GAN framework.

In this implementation of the present specification, the sample is a sample without being attacked, which can be ensured by using the previous trusted environment. Therefore, the second result data can be considered as authentic. If the second result data is not authentic, reliability of the discriminator obtained through training based on the second result data is adversely affected, and reliability of a model security detection result is reduced.

Figure 4:
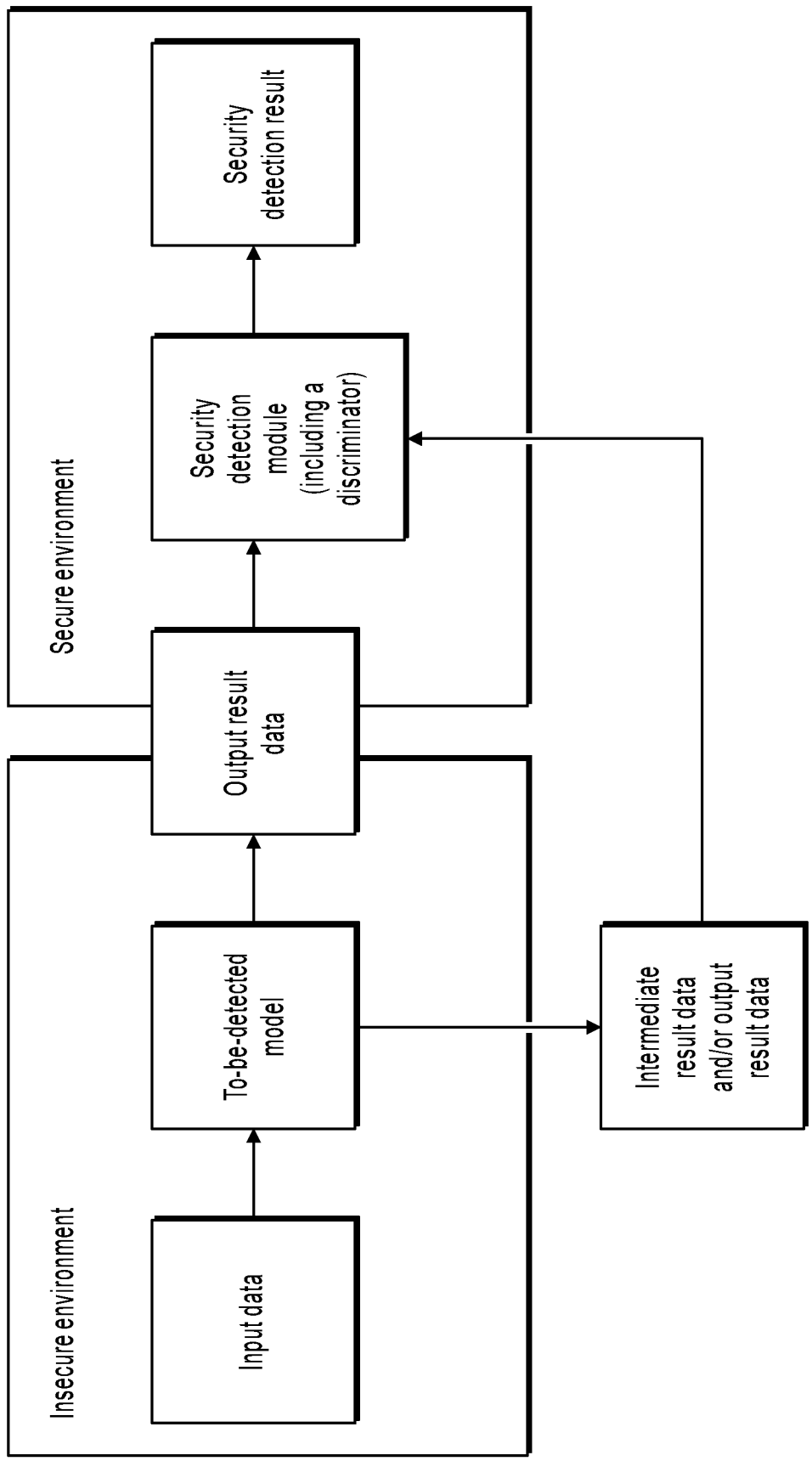
FIG. 4 is a schematic diagram illustrating a specific implementation solution of the model security detection method in actual applications, according to an implementation of the present specification.

In this implementation of the present specification, a specific implementation solution of the model security detection method in actual applications is described based on the previously described training process. FIG. 4 is a schematic diagram of the solution.

In FIG. 4, a security detection model includes at least a discriminator, and can further include processing logic after a discrimination result is obtained. Data is input to a to-be-detected model to obtain result data through computing. Intermediate result data and/or output result data are/is input to the security detection model, and are/is discriminated by the discriminator. After the discrimination result is obtained, a security detection result can be generated by using the security detection model based on the output result data and the discrimination result.

For example, if the output result data indicates that an operation corresponding to discriminating the input data by using the to-be-detected model is performed by the user, but the discrimination result is false (in other words, data distribution is out of expectation), it can be presumed that the computing process is probably attached, and the intermediate result data and/or the output result data are/is tampered with. Therefore, the generated security detection result can reflect such information: "The operation is performed by the user (representing the output result data computed by using the to-be-detected model), and the data is tampered with (representing the discrimination result of the discriminator)." A specific format and representation form of the security detection result are not limited.

Certainly, the security detection result can be generated based on only the discrimination result without considering the output result data.

The to-be-detected model is in an insecure environment (for example, the open environment described in the background), and can be probably attacked. To prevent a security detection module from being attacked, the security detection module can be in a predetermined secure environment. The secure environment can be built based on software and/or hardware. For example, the secure environment can be a trusted execution environment (TEE).

Based on the previous description, the discriminating the result data by using a discriminator in step S204 can include: discriminating whether the result data is true or false by using the discriminator, where a discrimination result reflects whether distribution of the result data is consistent with that of the second result data.

Further, the discriminating the result data by using a discriminator, and determining a security detection result of the to-be-detected model includes the following: discriminating the result data by using the discriminator to obtain the discrimination result, and determining the security detection result of the to-be-detected model based on the discrimination result, or obtaining the output result data, and determining the security detection result of the to-be-detected model based on the output result data and the discrimination result.

Figure 5:
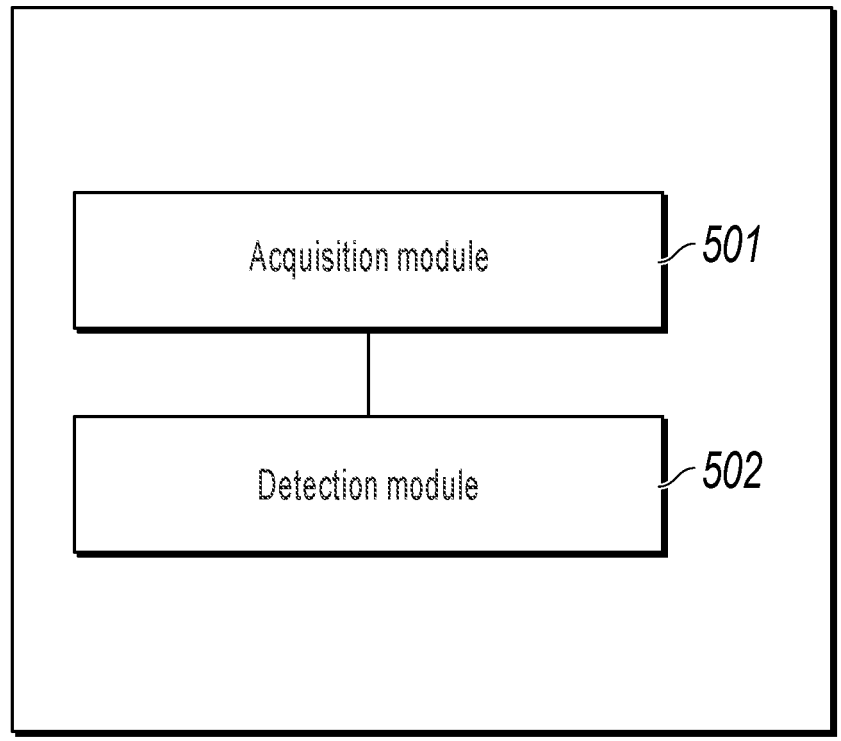
FIG. 5 is a schematic structural diagram illustrating an apparatus for detecting model security corresponding to FIG. 2, according to an implementation of the present specification.

Based on a same idea, as shown in FIG. 5, an implementation of the present specification further provides a corresponding apparatus.

FIG. 5 is a schematic structural diagram illustrating an apparatus for detecting model security corresponding to FIG. 2, according to an implementation of the present specification. The apparatus includes the following: an acquisition module 501, configured to obtain result data computed by using a to-be-detected model, where the result data includes intermediate result data and/or output result data, and a detection module 502, configured to discriminate the result data by using a discriminator, and determine a security detection result of the to-be-detected model, where the discriminator is obtained through training by using a GAN framework, the to-be-detected model, and a sample.

Optionally, the to-be-detected model is a deep learning model, and the intermediate result data is data computed at an intermediate layer of the to-be-detected model.

Optionally, that the discriminator is obtained through training by using a GAN framework, the to-be-detected model, and a sample includes the following: obtaining second result data computed by using the to-be-detected model for the sample, where the second result data includes second intermediate result data and/or second output result data, and obtaining a corresponding GAN through training by using the second result data and the GAN framework, where the GAN includes a generator and the discriminator.

Optionally, the second result data is authentic.

Optionally, the obtaining a corresponding GAN through training by using the second result data and the GAN framework includes the following: generating data to be input to the generator based on random data and/or the second result data, and obtaining the corresponding GAN through training based on the second result data, the data to be input to the generator, and the GAN framework.

Optionally, that the detection module 502 discriminates the result data by using a discriminator includes the following: the detection module 502 discriminates whether the result data is true or false by using the discriminator, where a discrimination result reflects whether distribution of the result data is consistent with that of the second result data.

Optionally, that the detection module 502 discriminates the result data by using a discriminator, and determines a security detection result of the to-be-detected model includes the following: the detection module 502 discriminates the result data by using the discriminator to obtain the discrimination result, and determines the security detection result of the to-be-detected model based on the discrimination result, or the detection module 502 obtains the output result data, and determines the security detection result of the to-be-detected model based on the output result data and the discrimination result.

Optionally, the discriminator is in a predetermined secure environment.

Optionally, the discriminator is located in a user terminal.

Based on the same idea, an implementation of the present specification further provides a corresponding electronic device, including the following: at least one processor, and a memory communicatively connected to the at least one processor.

The memory stores an instruction that can be executed by the at least one processor, and the instruction is executed by the at least one processor, to enable the at least one processor to: obtain result data computed by using a to-be-detected model, where the result data includes intermediate result data and/or output result data; and discriminate the result data by using a discriminator, and determine a security detection result of the to-be-detected model, where the discriminator is obtained through training by using a GAN framework, the to-be-detected model, and a sample.

Based on the same idea, an implementation of the present specification further provides a corresponding non-volatile computer storage medium, where the non-volatile computer storage medium stores a computer executable instruction, and the computer executable instruction is set to: obtain result data computed by using a to-be-detected model, where the result data includes intermediate result data and/or output result data, and discriminate the result data by using a discriminator, and determine a security detection result of the to-be-detected model, where the discriminator is obtained through training by using a GAN framework, the to-be-detected model, and a sample.

Specific implementations of the present specification are described above. Other implementations fall within the scope of the appended claims. In some situations, the actions or steps described in the claims can be performed in an order different from the order in the implementation and the desired results can still be achieved. In addition, the process depicted in the accompanying drawings does not necessarily require a particular execution order to achieve the desired results. In some implementations, multi-tasking and parallel processing can be advantageous.

The implementations in the present specification are described in a progressive way. For same or similar parts of the implementations, references can be made to the implementations. Each implementation focuses on a difference from other implementations. Especially, an apparatus embodiment, an electronic device embodiment, a non-volatile computer storage medium embodiment are basically similar to a method embodiment, and therefore is described briefly, for related parts, reference is made to partial descriptions in the method embodiment.

The apparatus, the electronic device, and the non-volatile computer storage medium provided in the embodiments of the present specification correspond to the method. Therefore, the apparatus, the electronic device, and the non-volatile computer storage medium also have beneficial technical effects similar to a beneficial technical effect of the corresponding method. The beneficial technical effect of the method is described in detail above, so that the beneficial technical effects of the corresponding apparatus, electronic device, and non-volatile computer storage medium are not described here again.

In the 1990 s, whether a technical improvement is a hardware improvement (for example, an improvement to a circuit structure, such as a diode, a transistor, or a switch) or a software improvement (an improvement to a method procedure) can be clearly distinguished. However, as technologies develop, current improvements to many method procedures can be considered as direct improvements to hardware circuit structures. A designer usually programs an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer performs programming to "integrate" a digital system to a PLD without requesting a chip manufacturer to design and produce an application-specific integrated circuit chip. In addition, at present, instead of manually manufacturing an integrated circuit chip, such programming is mostly implemented by using "logic compiler" software. The logic compiler software is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog2 are most commonly used. A person skilled in the art should also understand that a hardware circuit that implements a logical method procedure can be readily obtained once the method procedure is logically programmed by using the several described hardware description languages and is programmed into an integrated circuit.

A controller can be implemented by using any appropriate method. For example, the controller can be a microprocessor or a processor, or a computer-readable medium that stores computer readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. The memory controller can also be implemented as a part of the control logic of the memory. A person skilled in the art also knows that, in addition to implementing the controller by using the computer readable program code, logic programming can be performed on method steps to allow the controller to implement the same function in forms of the logic gate, the switch, the application-specific integrated circuit, the programmable logic controller, and the built-in microcontroller. Therefore, the controller can be considered as a hardware component, and an apparatus configured to implement various functions in the controller can also be considered as a structure in the hardware component. Or the apparatus configured to implement various functions can even be considered as both a software module implementing the method and a structure in the hardware component.

The system, apparatus, module, or unit illustrated in the previous implementations can be implemented by using a computer chip or an entity, or can be implemented by using a product having a certain function. A typical implementation device is a computer. The computer can be, for example, a personal computer, a laptop computer, a cellular phone, a camera phone, a smartphone, a personal digital assistant, a media player, a navigation device, an email device, a game console, a tablet computer, or a wearable device, or a combination of any of these devices.

For ease of description, the apparatus above is described by dividing functions into various units. Certainly, when the present specification is implemented, a function of each unit can be implemented in one or more pieces of software and/or hardware.

A person skilled in the art should understand that an implementation of the present specification can be provided as a method, a system, or a computer program product. Therefore, the implementations of the present specification can use a form of hardware only implementations, software only implementations, or implementations with a combination of software and hardware. Moreover, the implementations of the present specification can use a form of a computer program product that is implemented on one or more computer-usable storage media (including but not limited to a disk memory, a CD-ROM, an optical memory, etc.) that include computer-usable program code.

The present specification is described with reference to the flowcharts and/or block diagrams of the method, the device (system), and the computer program product based on the implementations of the present specification. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so that the instructions executed by the computer or the processor of the another programmable data processing device generate a device for implementing a specific function in one or more processes in the flowcharts and/or in one or more blocks in the block diagrams.

These computer program instructions can be stored in a computer readable memory that can instruct the computer or the other programmable data processing devices to work in a specific way, so that the instructions stored in the computer readable memory generate an artifact that includes an instruction device. The instruction device implements a specific function in one or more processes in the flowcharts and/or in one or more blocks in the block diagrams.

These computer program instructions can be loaded onto the computer or another programmable data processing device, so that a series of operations and operations and steps are performed on the computer or the another programmable device, thereby generating computer-implemented processing. Therefore, the instructions executed on the computer or other programmable devices provide steps for implementing a specific function in one or more processes in the flowcharts and/or in one or more blocks in the block diagrams.

In a typical configuration, a computing device includes one or more processors (CPU), an input/output interface, a network interface, and a memory.

The memory can include a non-persistent memory, a random access memory (RAM), a non-volatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of a computer storage medium include but are not limited to a phase change memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette magnetic tape, a magnetic tape/magnetic disk storage or another magnetic storage device. The computer storage medium can be used to store information accessible by the computing device. Based on the definition in the present specification, the computer readable medium does not include transitory computer readable media (transitory media) such as a modulated data signal and carrier.

It is worthwhile to further note that, the terms "include", "contain", or their any other variants are intended to cover a non-exclusive inclusion, so a process, a method, a product or a device that includes a list of elements not only includes those elements but also includes other elements which are not expressly listed, or further includes elements inherent to such process, method, product or device. Without more constraints, an element preceded by "includes a . . . " does not preclude the existence of additional identical elements in the process, method, product or device that includes the element.

The present specification can be described in the general context of computer-executable instructions, for example, a program module. Generally, the program module includes a routine, a program, an object, a component, a data structure, etc. executing a specific task or implementing a specific abstract data type. The present specification can alternatively be practiced in distributed computing environments in which tasks are performed by remote processing devices that are connected through a communications network. In a distributed computing environment, the program module can be located in both local and remote computer storage media including storage devices.

The implementations in the present specification are described in a progressive way. For same or similar parts of the implementations, references can be made to the implementations. Each implementation focuses on a difference from other implementations. Particularly, a system implementation is basically similar to a method implementation, and therefore, is described briefly. For related parts, refer to related descriptions in the method implementation.

The previous implementations are implementations of the present specification, and are not intended to limit the present application. A person skilled in the art can make various modifications and changes to the present application. Any modification, equivalent replacement, or improvement made without departing from the spirit and principle of the present application shall fall within the scope of the claims in the present application.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A method for detecting a model security, the method comprising:
    obtaining result data computed by using a model for current input data, wherein the result data comprises intermediate result data or output result data;
    obtaining, in a trusted execution environment, second result data computed by using the model for a plurality of samples, wherein the second result data comprises second intermediate result data or second output result data;
    obtaining a GAN through training by using the second result data, wherein the GAN comprises a generator and the discriminator, and wherein obtaining the GAN comprises:
        obtaining, in the trusted execution environment, the discriminator through training based on a generative adversarial network (GAN) framework, the model, and the plurality of samples;
        generating data to be input to the generator based on the second result data; and
        obtaining the generator through training based on the second result data, the data to be input to the generator, and the GAN framework;
    discriminating the result data by using the discriminator and based on comparing respective distributions of the result data and the second result data, to detect whether the model is currently secure; and
    determining a security detection result of the model.

2. The method according to claim 1, wherein the model is a deep learning model, and the intermediate result data is data computed at an intermediate layer of the model.

3. The method according to claim 1, wherein the second result data is authentic.

4. The method according to claim 1, wherein generating data to be input to the generator further comprises:
    generating data to be input to the generator based on random data.

5. The method according to claim 2, wherein discriminating the result data by using a discriminator comprises:
    discriminating whether the result data is true or false by using the discriminator, wherein a discrimination result reflects whether distribution of the result data is consistent with the second result data.

6. The method according to claim 5, wherein discriminating the result data by using the discriminator, and determining the security detection result of the model comprises:
    discriminating the result data by using the discriminator to obtain the discrimination result; and
    determining the security detection result of the model based on the discrimination result.

7. The method according to claim 5, wherein the discriminating the result data by using the discriminator, and determining the security detection result of the model comprises:
    obtaining the output result data; and
    determining the security detection result of the model based on the output result data and the discrimination result.

8. The method according to claim 1, wherein the discriminator is in a predetermined secure execution environment.

9. The method according to claim 8, wherein the discriminator is in a user terminal.

10. The method according to claim 1, wherein the execution environment comprises a relatively open environment.

11. The method according to claim 1, wherein the model comprises a risk control engine installed on a user device.

12. The method according to claim 1, wherein the model comprises a deep learning model and the result data comprises a vector.

13. The method according to claim 1, wherein the random data comprises a randomly generated vector.

14. A non-transitory, computer-readable medium storing one or more instructions executable by a computer system to perform operations for detecting a model security, the operations comprising:
obtaining result data computed by using a model for current input data, wherein the result data comprises intermediate result data or output result data;
obtaining, in a trusted execution environment, second result data computed by using the model for a plurality of samples, wherein the second result data comprises second intermediate result data or second output result data;
obtaining a GAN through training by using the second result data, wherein the GAN comprises a generator and the discriminator, and wherein obtaining the GAN comprises:
obtaining, in the trusted execution environment, the discriminator through training based on a generative adversarial network (GAN) framework, the model, and the plurality of samples;
generating data to be input to the generator based on the second result data; and
obtaining the generator through training based on the second result data, the data to be input to the generator, and the GAN framework;
discriminating the result data by using the discriminator and based on comparing respective distributions of the result data and the second result data, to detect whether the model is currently secure; and
determining a security detection result of the model.

15. The computer-readable medium according to claim 14, wherein generating data to be input to the generator further comprises:
generating data to be input to the generator based on random data.

16. A computer-implemented system, comprising:
one or more computers; and
one or more computer memory devices interoperably coupled with the one or more computers and having tangible, non-transitory, machine-readable media storing one or more instructions that, when executed by the one or more computers, perform operations for detecting a model security, the operations comprising:
obtaining result data computed by using a model for current input data, wherein the result data comprises intermediate result data or output result data;
obtaining, in a trusted execution environment, second result data computed by using the model for a plurality of samples, wherein the second result data comprises second intermediate result data or second output result data;
obtaining a GAN through training by using the second result data, wherein the GAN comprises a generator and the discriminator, and wherein obtaining the GAN comprises:
obtaining, in the trusted execution environment, the discriminator through training based on a generative adversarial network (GAN) framework, the model, and the plurality of samples;
generating data to be input to the generator based on the second result data; and
obtaining the generator through training based on the second result data, the data to be input to the generator, and the GAN framework;
discriminating the result data by using the discriminator and based on comparing respective distributions of the result data and the second result data, to detect whether the model is currently secure; and
determining a security detection result of the model.

17. The computer-implemented system according to claim 16, wherein generating data to be input to the generator further comprises:
generating data to be input to the generator based on random data.

* * * * *